United States Patent
Tanaka

(10) Patent No.: US 6,522,109 B2
(45) Date of Patent: Feb. 18, 2003

(54) POWER CONVERSION APPARATUS

(75) Inventor: Katsuaki Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/062,094

(22) Filed: Jan. 31, 2002

(65) Prior Publication Data

US 2002/0079871 A1 Jun. 27, 2002

Related U.S. Application Data

(63) Continuation of application No. PCT/JP01/05767, filed on Jul. 3, 2001.

(30) Foreign Application Priority Data

Jul. 5, 2000 (JP) .......................................... 2000-203776

(51) Int. Cl.$^7$ .............................................. G05F 1/656
(52) U.S. Cl. ........................ 323/222; 323/225; 323/235; 323/271; 323/285
(58) Field of Search ................................ 323/222, 224, 323/225, 235, 268, 271, 282, 285

(56) References Cited

U.S. PATENT DOCUMENTS

| 5,486,752 | A | | 1/1996 | Hua et al. | |
| 5,914,587 | A | * | 6/1999 | Liu | 323/222 |
| 5,991,174 | A | * | 11/1999 | Farrington et al. | 323/222 |
| 6,051,961 | A | * | 4/2000 | Jang et al. | 323/224 |
| 6,060,867 | A | * | 5/2000 | Farrington et al. | 323/222 |

FOREIGN PATENT DOCUMENTS

| JP | 07-241072 | 9/1995 |
| JP | 09-322541 | 12/1997 |
| JP | 2000-23454 | 1/2000 |

OTHER PUBLICATIONS

Guichao Hua, Eric X. Yang, Yimin Jiang and Fred C. Lee, Fellow, IEEE: "Novel Zero–Current–Transition PWM Converters", IEEE Transactions on Power Electronics, vol. 9, No. 6, Nov. 1994, pp. 601–606 —entire document.

* cited by examiner

Primary Examiner—Michael Sherry
Assistant Examiner—Gary L. Laxton
(74) Attorney, Agent, or Firm—Cohen, Pontani, Lieberman & Pavane

(57) ABSTRACT

The present invention provides a power conversion apparatus capable of controlling switching timings of main and auxiliary switches to achieve soft-switching in both of the main and auxiliary switches. The power conversion apparatus comprises a control circuit operable to apply a turning-on signal to first and second auxiliary switches so as to turn on the first and second auxiliary switches to lead a current from an output terminal to an resonant inductor when a current from an input reactor is passing through the main switch before a turning-on signal is applied to the main switch. Subsequently, when a current passing through the resonant inductor is increased up to the same value as that of a current passing through the input reactor by a resonance generated in a resonant circuit formed of the resonant inductor and a snubber capacitor to provide approximately zero of the end voltage across the main switch, the control circuit is operable to apply a turning-on signal to the main switch.

2 Claims, 3 Drawing Sheets

POWER CONVERSION APPARATUS

This application is a Continuation of International Application No. PCT/JP01/05767, filed on Jul. 3, 2001.

TECHNICAL FIELD

The present invention relates to a power conversion apparatus including a switching element to be on/off controlled. More specifically, the present invention relates to a power conversion apparatus including a control circuit capable of achieving soft-switching of the switching element.

BACKGROUND ART

As proposed in U.S. Pat. No. 5,486,752, there has heretofore been known a PWM boost-up converter comprising an input reactor and a main switch connected in series with each other, wherein the input reactor and main switch are connected to a DC source and to an output terminal through an output diode, and the main switch is on/off controlled to obtain a stepped-up output, characterized by additionally including a serial resonant circuit composed of an inductor and a capacitor, and an auxiliary circuit composed of an auxiliary switch and an auxiliary diode to allow the main switch to be turned off at a zero current state, whereby a voltage surge can be suppressed to provide reduced turn-off loss. The same circuit is also described in the article titled "Novel Zero-Current-Transition PWM Converters", IEEE TRANSACTIONS ON POWER ELECTRONICS, Vol. 9, No. 6, pp 601–606, November 1994.

This circuit is constructed such that the auxiliary switch is turned on before turning off the main switch so as to pass a resonant current through the serial resonant circuit to conduct a diode connected in parallel with the main switch, and the main switch is turned off during a zero-current state yielded by the conduction of the diode. This circuit allows the main switch to be turned off at a zero-current state and thereby the voltage surge otherwise occurring at the main switch can be suppressed. This makes it possible to omit a snubber circuit and to achieve reduced turn-off loss, high efficiency and lowered noise.

However, in this conventional apparatus, a certain current is inevitably passing through the auxiliary switch when it is turned off, which undesirably causes a turn-off loss at the auxiliary switch. Further, if the main switch is turned on when a continuous current is passing through the reactor, a recovery current from the output diode passes through the main switch, resulting in occurrence of a turn-on loss and noise. Thus, the conventional circuit described in the aforementioned publications has suffered from limitations in enhancing efficiency and reducing noise.

DISCLOSURE OF THE INVENTION

It is an object of the present invention to solve the above problems in the PWM boost-up converter, specifically to provide a desirable switching timing control of the main and auxiliary switches, capable of achieving soft-switching in both the main and auxiliary switches, which allows switching-loss otherwise occurring at these switches to be reduced so as to provide high-efficiency, and allows voltage surge and current surge otherwise occurring in switching operations to be reduced so as to provide lowered noise.

The present invention essentially relates to a power conversion apparatus including positive and negative input terminals, positive and negative output terminals, an input reactor having one end connected to the positive input terminal, a main switch having one end connected with the other end of the input reactor and the other end connected to both the negative input terminal and the negative output terminal, a first diode connected in parallel with the main switch to have a forward direction from the negative input terminal to the positive input terminal, a main diode connected between the positive output terminal and the junction between the input reactor and the main switch to have a forward direction toward the positive output terminal, and a control circuit applied with a voltage between the output terminals as an input to form a switching signal for controlling an on/off operation of the main switch, wherein the main switch is on/off controlled according to the switching signal from the control circuit to generate an output.

In order to achieve the aforementioned object, according to the present invention, a snubber capacitor is connected in parallel with at least one of the main switch and the main diode. Further, there is provided a first auxiliary resonant circuit including first and second auxiliary switches connected in series with each other, a resonant inductor connected in series with the first and second auxiliary switches, and first and second auxiliary diodes connected in parallel with the first and second auxiliary switches, respectively, and the first auxiliary resonant circuit is connected between the negative input terminal and the junction between the main switch and the input reactor to have a forward direction of the auxiliary diode toward the junction between the main switch and the input reactor. Furthermore, a second auxiliary resonant circuit including third and fourth auxiliary diodes connected in series with each other is connected between the positive output terminal and the resonant inductor. A voltage detector is provided for detecting respective end voltages across the main switch and the auxiliary switches to generate voltage signals representing the respective end voltages and to input the end voltage signals to the control circuit. When a current from the input reactor is passing through the main diode before a turning-on signal is applied to the main switch, the control circuit is operable to apply a turning-on signal to the first and second auxiliary switches so as to turn on the first and second auxiliary switches to lead a current from the output terminals to the resonant inductor. Further, when a current passing through the resonant inductor is subsequently increased up to the same value as that of a current passing through the input reactor by a resonance generated in a resonant circuit formed of the resonant inductor and the snubber capacitor to provide approximately zero of the end voltage across the main switch, the control circuit is operable to apply a turning-on signal to the main switch.

In one embodiment of the present invention, there is provided an auxiliary-switch snubber capacitor connected between the junction between the first and second auxiliary switches and the junction between the third and fourth auxiliary diodes. Further, there is provided a voltage-detecting device for detecting a charged voltage of the auxiliary-switch snubber capacitor and for inputting a signal representing the charging voltage to the control circuit. When the charging voltage of the auxiliary-switch snubber capacitor is approximately equal to the voltage between the output terminals after the main switch is turned on, the control circuit is operable to apply a turning-off signal to the first auxiliary switch. Further, when the charging voltage of the auxiliary-switch snubber capacitor subsequently becomes approximately zero, the control circuit is operable to apply a turning-off signal to the second auxiliary switch.

BRIEF DESCRIPTION OF THE DRAWINGS

FIG. 2 is an operating waveform diagram in the state when an initial voltage of an auxiliary-resonant-commutation-circuit snubber capacitor in the circuit of FIG. 1 is approximately equal to a voltage between output terminals and an output switch is turned on; and FIG. 3 is an operating waveform diagram in the state when the initial voltage of the auxiliary-resonant-commutation-circuit snubber capacitor in the circuit of FIG. 1 is approximately zero and an output switch is turned on.

BEST MODE FOR CARRYING OUT THE INVENTION

Figure 1:
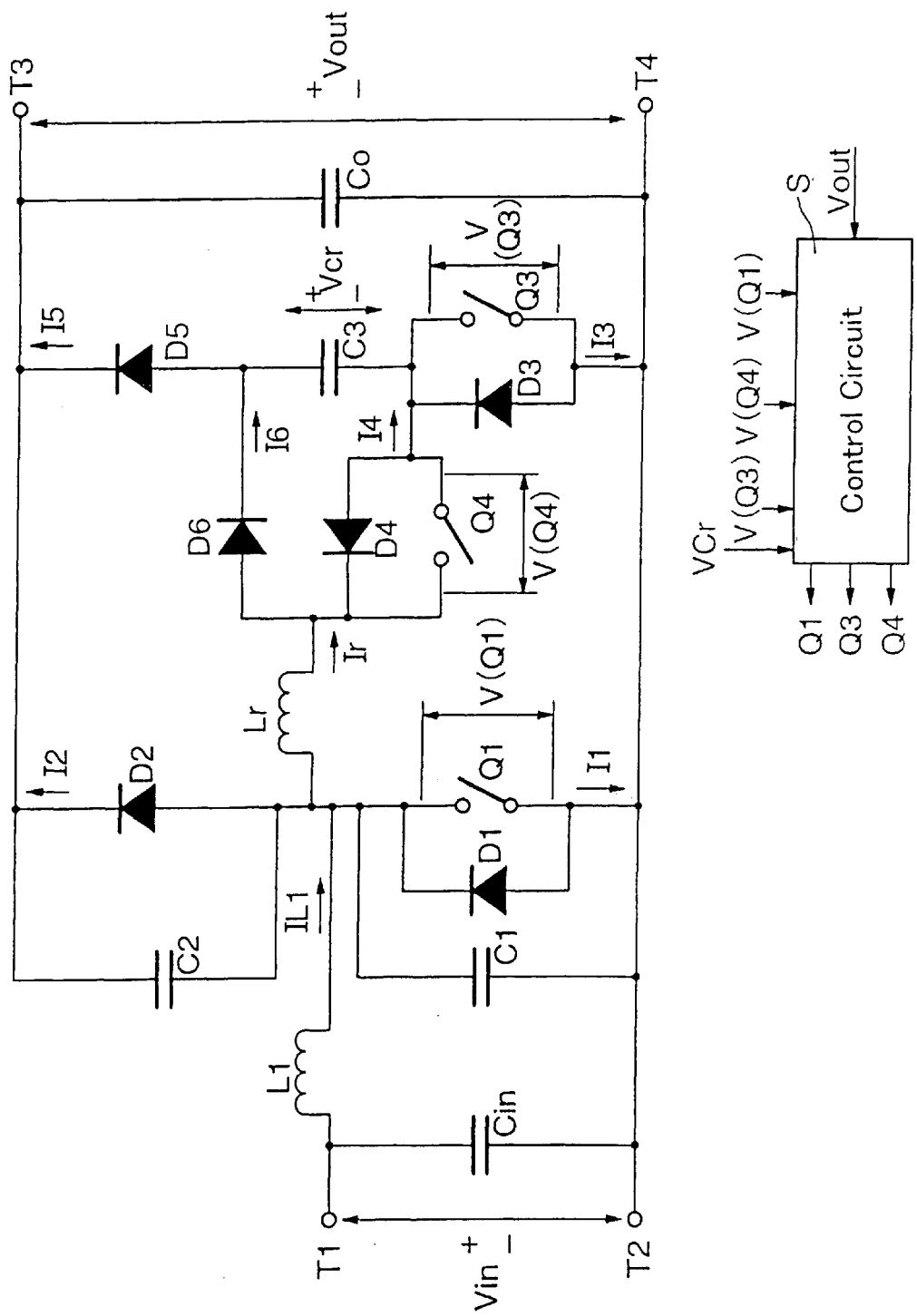
FIG. 1 is a circuit diagram of a power conversion apparatus showing one embodiment of the present invention.

With reference to the drawings, an embodiment of the present invention will now be described. Referring to FIG. 1, a power conversion apparatus for one embodiment of the present invention comprises a positive input terminal T1, a negative input terminal T2, a positive output terminal T3, and a negative output terminal T4. One end of an input reactor L1 is connected to the positive input terminal T1. The other end of the input reactor L1 is connected to both the negative input terminal T2 and the negative output terminal T4 through a main switch Q1. A diode D1 is connected in parallel with the main switch Q1. The diode D1 is arranged to have a forward direction from the negative input terminal T2 to the positive input terminal T1.

An input capacitor Cin is connected between the positive input terminal T1 and the negative input terminal T2, and in parallel with the input reactor L1 and the main switch Q1 connected in series with each other. Moreover, a snubber capacitor C1 is connected in parallel to the main switch Q1.

The junction between the input reactor L1 and the main switch Q1 is connected to the positive output terminal T3 through a main diode D2. A second snubber capacitor C2 is connected in parallel with the output diode D2. An output capacitor C0 is connected between the output terminals T3 and T4.

The illustrated circuit is provided with an auxiliary commutation circuit. This auxiliary commutation circuit includes a first auxiliary switch Q3 and a second auxiliary switch Q4 connected in series with each other, and the first auxiliary switch Q3 is connected to the negative output terminal T4. The second auxiliary switch Q4 is connected to the junction between the main switch Q1 and the main diode D2 through a resonant inductor Lr. A first auxiliary diode D3 is connected in parallel with the first auxiliary switch Q3, and a second auxiliary diode D4 is connected in parallel with the second auxiliary switch Q4. The auxiliary diodes D3, D4 are arranged to have respective forward directions from the negative output terminal T4 to the resonant inductor Lr.

The auxiliary resonant circuit also includes a third auxiliary diode D5 and a fourth auxiliary diode D6 connected in series with each other. The third auxiliary diode D5 is connected to the positive output terminal T3, and the fourth auxiliary diode D6 is connected to the junction between the resonant inductor Lr and the second auxiliary switch Q4. The third and fourth auxiliary diodes D5, D6 are arranged to have respective forward directions from the resonant inductor Lr to the positive output terminal T3. An auxiliary-resonant-commutation-circuit snubber capacitor C3 is connected between the junction between the first and second auxiliary diodes D3, D4 and the junction between the third and fourth auxiliary diodes D5, D6.

The illustrated circuit further comprises a control circuit S for forming switching signals for controlling each switching operation of the aforementioned switches. In order to apply an input signal to the control circuit S, a voltage detector for detecting an output voltage Vout between the output terminals T3, T4, an end voltage V(Q1) across the main switch Q1, respective end voltages V(Q3), V(Q4) of the first and second auxiliary switches Q3, Q4, and a charged voltage Vcr of the snubber capacitor C3 is provided. The control circuit S receives signals representing these detected voltages from the voltage detector to generate the switching signals for on/off controlling each of the switches Q1, Q3, Q4.

Figure 2:
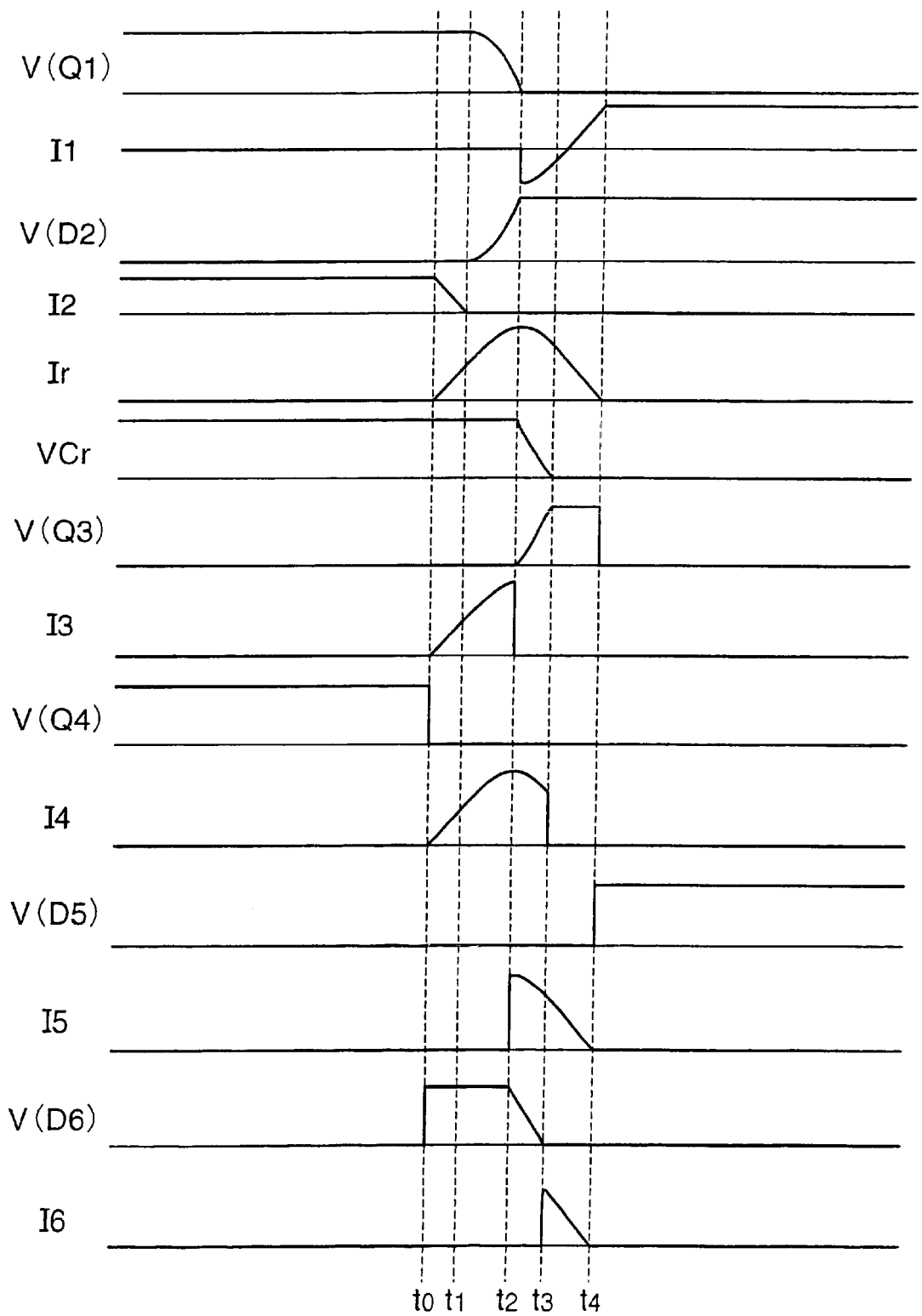

FIG. 2 is an operating waveform diagram in the operating state of the circuit of FIG. 1. Given that a current $I_{L1}$ passes through the input reactor L1 in the direction of the arrow of FIG. 1 when the main diode D2 is in its conduction state and the main switch Q1 is in its OFF state. When an initial voltage of the auxiliary-resonant-commutation-circuit snubber capacitor C3 is approximately equal to the output voltage Vout between the output terminals T3, T4, the first auxiliary switch Q3 and the second auxiliary switch Q4 are turned on at the time t0. Consequently, the voltage Vout between the output terminals is applied to the resonant inductor Lr to increase the inductor current Ir linearly. Simultaneously, a current passing through the output diode D2 is reduced in proportion to the increment.

At the time t1, the inductor current Ir becomes equal to the input reactor current $I_{L1}$. At this moment, a resonance is generated by the resonant inductor Lr and the snubber capacitors C1, C2. Thus, an end voltage across the main diode D2 starts to increase. At a time t2, the diode D1 connected in parallel with the main switch Q1 starts to be biased in the forward direction thereof, and thereby the inductor current Ir starts to reflux through the second and first auxiliary switches Q4, Q3 to the diode D1. After the time t2, the end voltage across the main switch Q1 becomes approximately zero as shown in FIG. 2. Thus, "zero-voltage turn-on" of the main switch Q1 can be achieved by turning on the main switch Q1 after the time t2.

When the first auxiliary switch Q3 is turn off after turning on the main switch Q1, the current in the circuit flows along a path from the diode D4 connected in parallel with the second auxiliary switch Q4 through the auxiliary-resonant-commutation-circuit snubber capacitor C3 to the third auxiliary diode D5. This causes discharge in the snubber capacitor. Thus, the voltage across the first auxiliary switch Q3 is increased with gradient, and thereby soft-switching can also be achieved in the first auxiliary switch Q3.

At the time t3, the fourth auxiliary diode D6 starts to be biased in the forward direction thereof Thus, an excited energy in the resonant inductor Lr is regeneratively returned to the output terminal along a path through the diode D1 connected in parallel with the main switch Q1, through the resonant inductor Lr, the fourth auxiliary diode D6, and the third auxiliary diode D5.

Figure 3:
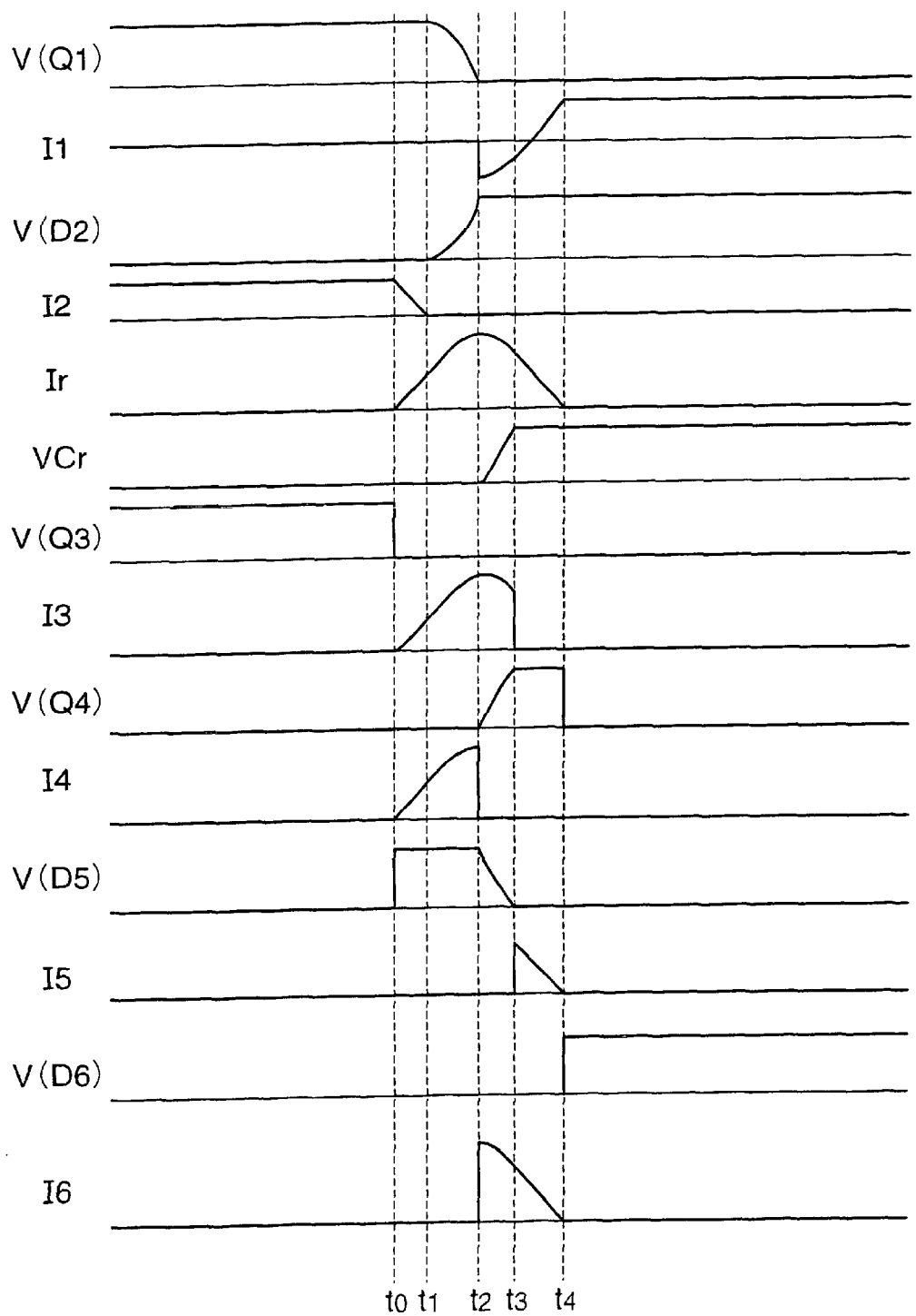

FIG. 3 shows an operating waveform of each portion of the circuit in the state when the initial voltage Vcr of the auxiliary-resonant-commutation-circuit snubber capacitor C3 is approximately zero. The operations from the time t0 to the time t2 are the same as those shown in FIG. 2. After the main switch Q1 is turned on at or after the time t2, the second auxiliary switch Q4 is turn off. Consequently, the current flows along a path from the fourth auxiliary diode D6 through the snubber capacitor C3 to the first auxiliary switch Q3. Thus, the inductor current Ir passes through the snubber capacitor C3 with charging the snubber capacitor C3, and thereby the end voltage across the second auxiliary switch Q4 is increased with gradient. As a result, soft-switching can also be achieved in the second auxiliary switch Q4.

At a time t3, the third auxiliary diode D5 starts to be biased in the forward direction thereof. Thus, the excited energy in the resonant inductor Lr is regeneratively returned to the output terminal along a path through the diode D1 connected in parallel with the main switch Q1, the resonant inductor Lr, the fourth auxiliary diode D6, and the third auxiliary diode D5.

Now, given that the input reactor current IL1 is passing in the direction of the arrow shown in FIG. 1 when the main switch Q1 is switched from its OFF state to its ON state and the main diode D2 is in a non-conduction state. When the main switch Q1 is turn off in this state, the end voltage across the main switch Q1 is increased with gradient by either one or both actions of the snubber capacitor C1 and the snubber capacitor C2. Thus, soft-switching can also be achieved in the main switch Q1 to provide reduced switching loss and suppressed noise.

As described above, according to the aforementioned circuit implementing the present invention, soft-switching can be achieved in all of the switches including the main switch Q1 and the auxiliary switches Q3, Q4 in the both states when the input reactor current IL1 commutates from the main diode D2 to the main switch Q1 and when the input reactor current IL1 commutates from the main switch Q1 to the main diode D2. Further, all accumulated energy in the resonant inductor Lr resulting from the commutation is regeneratively returned to the output terminal after the completion of the commutation. Thus, even if the auxiliary switches are added, the added auxiliary switches never involve any increase of switching loss. Further, the turn-on operation of the output switch Q1 never causes turn-off loss otherwise caused by the recovery current from the output diode D2. Thus, an improved boost-up converter having well-balanced higher efficient and lowered noise can be achieved.

What is claimed is:

1. A power conversion apparatus including positive and negative input terminals, positive and negative output terminals, an input reactor having one end connected to said positive input terminal, a main switch having one end connected with the other end of said input reactor and the other end connected to both said negative input terminal and said negative output terminal, a first diode connected in parallel with said main switch to have a forward direction from said negative input terminal to said positive input terminal, a main diode connected between said positive output terminal and the junction between said input reactor and said main switch to have a forward direction toward said positive output terminal, and a control circuit applied with a voltage between said output terminals as an input to form a switching signal for controlling an on/off operation of said main switch, wherein said main switch is on/off controlled according to said switching signal from said control circuit to generate an output, said power conversion apparatus comprising:

a snubber capacitor connected in parallel with at least one of said main switch and said main diode;

a first auxiliary resonant circuit including first and second auxiliary switches connected in series with each other, a resonant inductor connected in series with said first and second auxiliary switches, and first and second auxiliary diodes connected in parallel with said first and second auxiliary switches, respectively, said first auxiliary resonant circuit being connected between said negative input terminal and the junction between said main switch and said input reactor to have a forward direction of said first and second auxiliary diodes toward the junction between said main switch and said input reactor;

a second auxiliary resonant circuit including third and fourth auxiliary diodes connected in series with each other, said second auxiliary resonant circuit being connected between said positive output terminal and said resonant inductor; and a voltage detector for detecting respective end voltages across said main switch and said auxiliary switches to generate voltage signals representing the respective end voltages and to input said end voltage signals to said control circuit, wherein when a current from said input reactor is passing through said main diode before a turning-on signal is applied to said main switch, said control circuit is operable to apply a turning-on signal to said first and second auxiliary switches so as to turn on said first and second auxiliary switches to lead a current from said output terminals to said resonant inductor, and when a current passing through said resonant inductor is subsequently increased up to the same value as that of a current passing through said input reactor by a resonance generated in a resonant circuit formed of said resonant inductor and said snubber capacitor to provide approximately zero of the end voltage across said main switch, said control circuit is operable to apply a turning-on signal to said main switch.

2. A power conversion apparatus as defined in claim 1, which further includes:

an auxiliary-switch snubber capacitor connected between the junction between said first and second auxiliary switches and the junction between said third and fourth auxiliary diodes; and a voltage-detecting device for detecting a charged voltage of said auxiliary-switch snubber capacitor and for inputting a signal representing the charging voltage of said auxiliary-switch snubber capacitor to said control circuit, wherein when the charging voltage of said auxiliary-switch snubber capacitor is approximately equal to the voltage between said output terminals after said main switch is turned on, said control circuit is operable to apply a turning-off signal to said first auxiliary switch, and when the charging voltage of said auxiliary-switch snubber capacitor subsequently becomes approximately zero, said control circuit is operable to apply a turning-off signal to said second auxiliary switch.

* * * * *